US012244611B2

(12) United States Patent
Juncker et al.

(10) Patent No.: US 12,244,611 B2
(45) Date of Patent: Mar. 4, 2025

(54) SECURITY CONTENT DELIVERY BASED ON TAGGED PERSONAS

(71) Applicant: Code42 Software, Inc., Minneapolis, MN (US)

(72) Inventors: Rob Juncker, Lakeville, MN (US); Vijay Ramanathan, Eden Prairie, MN (US); Chrysa Freeman, Minneapolis, MN (US); Alex Matheson, Minneapolis, MN (US); Kyle Venberg, Minneapolis, MN (US)

(73) Assignee: Code42 Software, Inc., Minneapolis, MN (US)

( * ) Notice: Subject to any disclaimer, the term of this patent is extended or adjusted under 35 U.S.C. 154(b) by 252 days.

(21) Appl. No.: 17/847,353

(22) Filed: Jun. 23, 2022

(65) Prior Publication Data

US 2023/0421574 A1    Dec. 28, 2023

(51) Int. Cl.
*H04L 9/40* (2022.01)
*H04L 67/306* (2022.01)
*H04L 67/50* (2022.01)

(52) U.S. Cl.
CPC ........ *H04L 63/1408* (2013.01); *H04L 67/306* (2013.01); *H04L 67/535* (2022.05)

(58) Field of Classification Search
CPC ... H04L 63/12; H04L 63/126; H04L 63/1408; H04L 63/14; H04L 67/535; H04L 67/306
See application file for complete search history.

(56) References Cited

U.S. PATENT DOCUMENTS

| | | | | |
|---|---|---|---|---|
| 9,756,059 | B2* | 9/2017 | Demirjian | G06F 21/36 |
| 10,178,119 | B1* | 1/2019 | Brandwine | H04L 67/02 |
| 10,509,910 | B2* | 12/2019 | Mahaffey | H04L 69/14 |
| 11,729,251 | B2* | 8/2023 | Ankam | H04L 9/0863 |
| | | | | 709/217 |
| 11,882,144 | B2* | 1/2024 | Sheridan | G06N 20/00 |
| 11,886,232 | B2* | 1/2024 | Mahaffey | H04W 12/02 |
| 11,941,683 | B2* | 3/2024 | Matsuoka | H04L 67/535 |

* cited by examiner

*Primary Examiner* — Hosuk Song
(74) *Attorney, Agent, or Firm* — Schwegman Lundberg & Woessner, P.A.

(57) ABSTRACT

Systems and techniques for security content delivery based on tagged personas are described herein. User data may be obtained for a user of a network file system. Attributes may be extracted from the user data to establish a user persona. Event data may be obtained for a security event experienced by the network file system. The security event may be associated with the user. A set of available remediation content items may be identified using the event data. A content item may be selected from the set of remediation content items using the user persona. A transmission medium may be determined for transmission of the content item to the user using the user persona. The content item may be transmitted to the user via the transmission medium.

20 Claims, 5 Drawing Sheets

SECURITY CONTENT DELIVERY BASED ON TAGGED PERSONAS

TECHNICAL FIELD

Embodiments described herein generally relate to network-based file storage and, in some embodiments, more specifically to providing security content to users in response to security events based on tagged personas.

BACKGROUND

Network file systems may store a variety of data. The data may be stored centrally or may be distributed across the network among a variety of user drives, server devices, network attached storage devices, and the like. The network file system may be accessible by a variety of user devices. A user may use a device to move a file from one location to another within the network file system. Some files within the network file system may contain data that may be considered as sensitive. There may be a desire to prevent sensitive data from moving to unauthorized locations or devices. Security policies may be used to monitor and protect data in the network file system. It may be desired to provide users with feedback when a security policy is broken or when an activity puts network data at risk.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

When security issues are faced by a user, the user may take action to correct a behavior. Assistance may be provided to the user to tech the user preferred actions for securing network data without frustrating the user by providing feedback that may not be tailored to learning style or may not be provided according to content consumption preferences of the user.

People work, solve problems, and learn in different ways. In a context of providing security best practice or remediation content, users with more technical personas may prefer a simple training or feedback workflow that the user may follow by clicking on links versus less technical users that may prefer (or may have increased retention of content of) a short video, a very non-technical user may learn better from a longer step-by-step video and finally, while a user who is not technical may wish to connect with a support representative to learn about the event that prompted feedback and to assist in solving the underlying issue. The systems and techniques discussed herein delivers an appropriate level of training based upon user preferences perceived by a digital personae of the user determined using meta information supplied, or inferred by the titles supplied, via integrated systems that supply the attributes such as directory services, single sign on (SSO) systems, and other identity providers. The systems and techniques discussed herein allow security administrators and analysts to address events (e.g., security breaches, data corruption, etc.) while automation is used to address issues that may be mitigated through teaching, training, or through assisting a user through self-remediation.

Conventional security event remediation techniques rely on employees to match a remediation routine to a user and may be unable to automatically select content or content types for a user based upon a user persona. Thus, effective remediation routines may not be assigned to the user with appropriate content and remediation steps. The systems and techniques expand an educational pool to allow non-educational professionals to get the right training to the right users through automation and artificial intelligence (AI). Providing effective security education to users may be critical to reducing security breaches. The systems and techniques discussed herein deliver training via push notifications that eliminate uncertainty involved with relying on a user to seek education or remediation steps.

Figure 1:
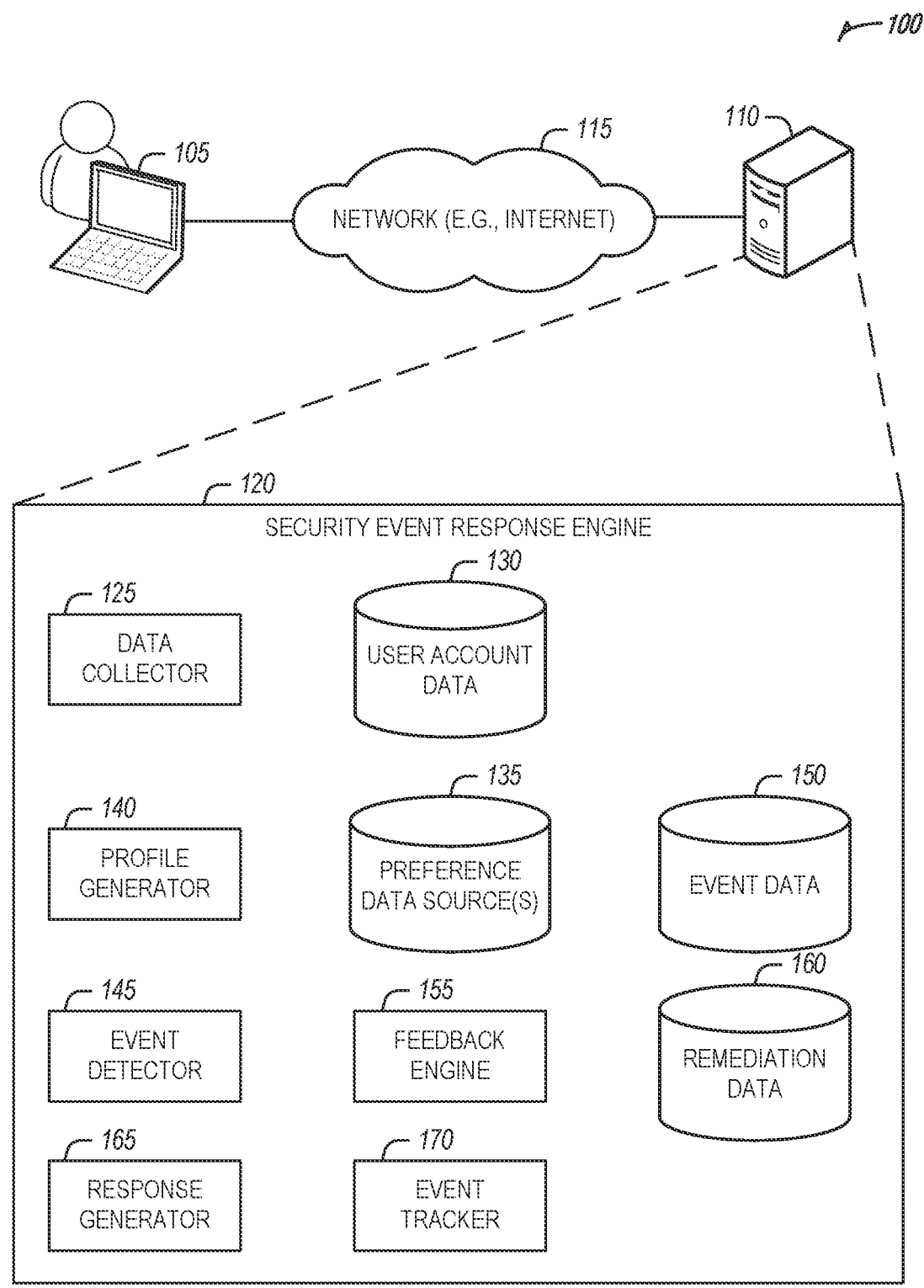
FIG. 1 is a block diagram of an example of an environment and a system for security content delivery based on tagged personas, according to an embodiment.

FIG. 1 is a block diagram of an example of an environment 100 and a system 120 for security content delivery based on tagged personas, according to an embodiment. The environment 100 may include a user computing device 105 (e.g., a mobile computing device, a desktop computing device, a notebook computing device, a tablet computing device, etc.) communicatively coupled to a network file system 110 (e.g., a cloud-based file storage system, a distributed network file system, etc.) via a network 115 (e.g., a wired network, a wireless network, the internet, etc.).

The network file system 110 may include (e.g., executing a service, executing on a server computing device, executing amongst a plurality of distributed server computing devices, etc.) the system 110. In an example, the system 110 may be a security event response engine. The system 110 may include a variety of components including a data collector 125, user account data 130, user preference data source(s) 135, a profile generator 140, an event detector 150, event data 150, a feedback engine 155, a response generator 165, remediation data 160, and an event tracker 170.

The user account data 130 may include account data for a user of the user computing device 105 including authentication used to access the network file service 115 and user profile data. The user account data may be supplemented by data from the preference data source(s) 135. Data included and retrieved from the preference data source(s) 135 may include, by way of example and not limitation, job title of the user, a department of the user, a billing code of the user, etc. The preference data source(s) 135 may include, by way of example and not limitation, network directory services, identify management systems, single-sign-on (SSO) systems, human resources information systems, human capital management systems, user maintained preferences, etc.

The data collector 125 collects data from the users account data and the preference data source(s) 135 to obtain information about the user that may be used to establish content consumption preferences of the user. The profile generator 140 obtains the user data collected by the data collector 125 to establish a content consumption profile for the user. In an example, the content consumption profile may be stored in the user account data 130.

The profile generator 140 may evaluate the user data using a set of preference classification rules or a machine learning model trained to classify users into preference groups based on probabilities output based on the input user data. The profile generator determines classification for the user regarding types of content that the user might receive and steps that the user may be asked to take to remediate a security event. For example, if a security analyst is to remediate issues related to non-high-risk exfiltration of data, by clicking one button it might result in a multitude of remediation awareness that depends on the user. For example, a user classified as an engineer may receive an email with bullets on steps to remediate the issue, a user classified as a technical support analyst may receive a one minute tutorial on actions the user performed that resulted in the issue, a user classified as a customer support analyst may receive a step-by-step video that explains how to remediate the issue, a user classified as a financial analyst may receive a notification to contact a help-desk for a manual walk-through of the remediation process. In another example, the help-desk analyst may receive instructions based upon the user that is flagged for this behavior based upon a support ticket or other mechanism.

Preference classification machine learning models may be trained using supervised or unsupervised training to evaluate data elements contained in training data that includes job titles, departments, billing codes, system usage history (e.g., email usages, text message usage, chat service usage, etc.), etc. The training may generate a model that indicates content consumption preferences such as a content format (e.g., video, text, images, etc.), content delivery medium (e.g., text message, chat message, email, instant message, etc.), and content detail level (e.g., number of steps, verboseness of instructions, jargon usage, etc.). The trained model may be used to calculate probabilities that a set of inputs are associated with the content consumption preferences. For example, inputs for a user may include a job title of engineer and a department of security and a probability of 0.95 may be output indicating a match between the user and high use of technical jargon. In another example, the inputs may include usage statistics for the user that indicate that the user communicates most frequently via chat message (e.g., as compared to email, text massage, etc.) and the model may determine that chat message is a preferred medium of the user.

In an example, a preference predicted by a model may be updated based on usage information collected for the user and feedback received from the user. For example, usage statistics may be unavailable for a new user and a preferences may be predicted without using the usage statistics. As the user uses systems and provides feedback (e.g., indicating an alternative medium, etc.), usage data and feedback may be used to refine the content consumption preference profile of the user.

The event detector 145 may determine that a security event has occurred based on an evaluation of the event data 150. The event data 150 may include information about security events that are occurring within the network file system 110. Security events may include, but are not limited to, file exfiltration (e.g., movement of files outside the network file system 115), unauthorized file access (e.g., read, write, delete attempts, etc.), unauthorized movement of files within the network file system 115, etc. The event data 150 may include an event type, a user associated with the event, computing systems associated with the event, files associated with the event, etc.

The event detector 145 may work in conjunction with the feedback engine 155 to select remediation content from the remediation data 160. The remediation data 160 may include a variety of remediation content including, but not limited to, videos, text, automated and manual remediation scripts, etc. The remediation content may include metadata or may be tagged with classifications (e.g., detail level, format, compatible transmission media, user profile categories, etc.) and event types (e.g., categories, classes, etc.) that may be used by the feedback engine 155 to select a remediation content item from the remediation data 160 based on the event (e.g., event type, etc.) and user classification data.

For example, an event may be detected with a non-high-risk exfiltration of data event type that was caused by a customer support analyst. A step-by-step remediation video included in the remediation data 160 may include metadata associated with non-high-risk exfiltration of data. The user may be associated with a customer support analyst user classification. The step-by-step remediation video may be selected from the remediation data 160 by the feedback engine 155. In an example, the metadata may include playlists, content markers, etc. that may be used to alter the content based on user classification. For example, a playlist associated with an increased detail level classification may cause more video segments of the video to be played (or transmitted, etc.) to the user while a playlist associated with a decreased detail level classification may cause the user to be presented with fewer video segments. In another example, the remediation data 160 may include a set of remediation content items and a content item may be selected for the user based on the content item having a set of attributes that most closely match (e.g., as determined using a fit function or other matching mechanism) to the content consumption preferences of the user.

The response generator 165 may receive output from the feedback engine 155 and may generate a response to be transmitted to the user. In an example, the response generator may select a content delivery medium from a set of available content delivery media based on content consumption preferences identified by the profile generator 140. For example, the customer support analyst may prefer notifications via text message transmitted to a mobile device and the response generator 165 may generate a text massage that includes the step-by-step remediation video (or a link to the video). The response generator 165 may transmit the generated response to the user.

The event tracker 170 may track the event to determine if the event has been remediated as a result of the transmitted event response. If the event has been resolved, the event detector 145 continues to monitor for additional events to be remediated. If the event has not been resolved, the feedback engine 155 may select additional content from the remediation data 160 to be included in an additional response to be transmitted to the user. For example, a second response may be transmitted to the customer support analyst that includes a remediation script that includes step-by-step instructions for remediating the event. If the event tracker 170 determines that the remediation script resulted in resolution of the event, an indication may be transmitted to the profile generator 140. The profile generator 140 may update the content consumption preferences for the user. For example, the profile generator 140 may increase a preference indicator for text content and may decrease a preference indicator for video content. Thus, remediation steps are verified to determine remediation steps were taken. If escalation results in providing alternate content to the user, the user content consumption preferences may be updated for use in selecting effective remediation content for the user for future events.

Figure 2:
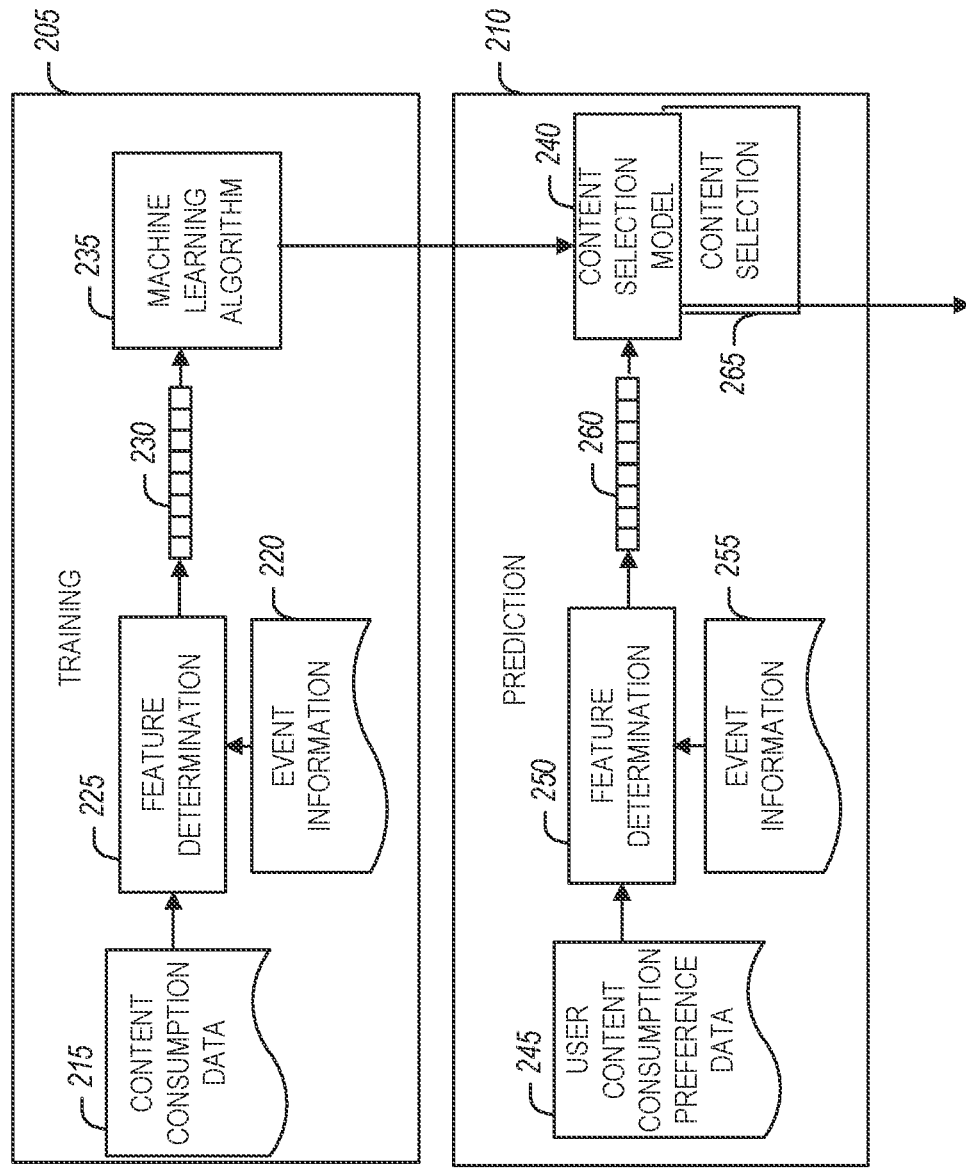
FIG. 2 illustrates an example machine learning component for response generation for security content delivery based on tagged personas, according to an embodiment.

FIG. 2 illustrates an example machine learning component 200 for response generation for predicted event-driven interactions, according to some embodiments. The machine learning component 200 may be used by the profile generator 140 and the feedback engine 155 as described in FIG. 1. The machine learning component utilizes a training module 205 and a prediction module 210. Training module 205 feeds content consumption data 215 and event information 220 into feature determination module 225 which determines one or more features 230 from this information. Features 230 are a subset of the information input and is information determined to be predictive of content preferences of a user based on profile data. Examples include one or more of: job title, department, previous content consumption choices of the user, billing code, communication medium usage data, etc.

The machine learning algorithm 235 produces a content selection model 240 based upon the features and feedback associated with those features. For example, the features associated with content consumption preferences of users relating to the event are used as a set of training data. As noted above, the content selection model 240 may be for the entire system (e.g., built of training data accumulated throughout the entire system, regardless of the user consuming the content), or may be built specific for each event, each content type, or event and content type pair.

In the prediction module 210, the current user content consumption preference data 245 may be input to the feature determination module 250. Similarly the event information 255 is also input to the feature determination module 250. Feature determination module 250 may determine the same set of features or a different set of features as feature determination module 225. In some examples, feature determination module 250 and 225 are the same module. Feature determination module 250 produces features 260, which are input into the content selection model 240 to perform content selection 265. The training module 205 may operate in an offline manner to train the content selection model 240. The prediction module 210, however, may be designed to operate in an online manner as each user profile is evaluated as events occur.

It should be noted that the content selection model 240 may be periodically updated via additional training and/or user feedback. The user feedback may be feedback from users that provide explicit feedback (e.g., responses to questions about whether the interaction was a result of the event, etc.) or may be automated feedback based on outcomes of the remediation content provided to the user. For example, a user consuming content may provide an explicit response indicating a preference for alternate content and the response may be used as additional training data for updating the content selection model 240.

The machine learning algorithm 235 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, and hidden Markov models. Examples of unsupervised learning algorithms include expectation-maximization algorithms, vector quantization, and information bottleneck method. In an example embodiment, a multi-class logistical regression model is used.

Figure 5:
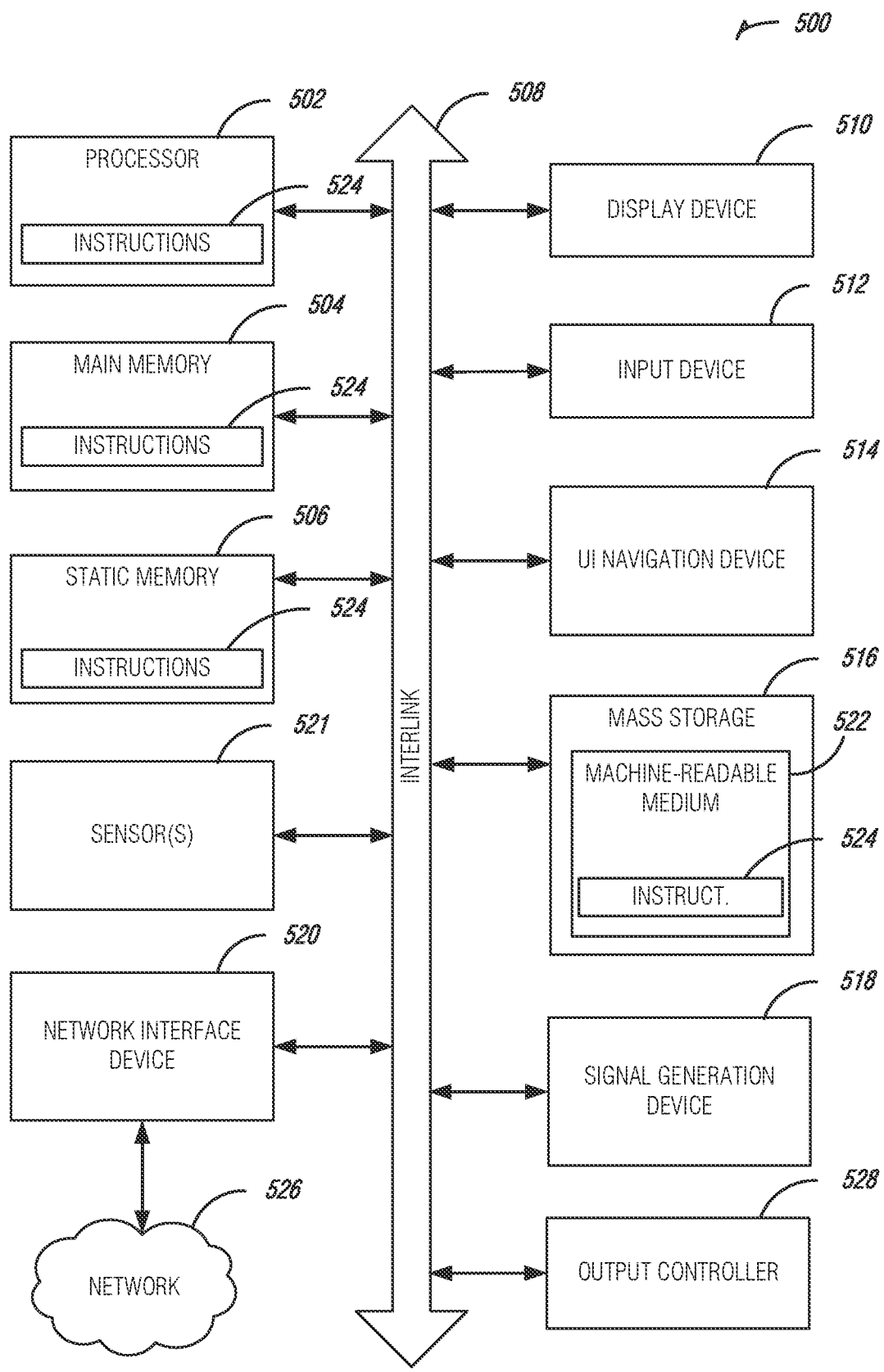
FIG. 5 is a block diagram illustrating an example of a machine upon which one or more embodiments may be implemented.

The system 120 as described in FIG. 1 and the machine learning component 200 may be implemented on one or more computing devices, such as machine 500 of FIG. 5. As such, some of the components of FIG. 1 may communicate with each other via inter-process communication and other local communications techniques (e.g., shared memory, pipes, buffers, queues). In other examples, the components of FIG. 1 may be parts of different services or systems and thus the components may communicate with each other through a computer network using computer networking protocols.

Figure 3:
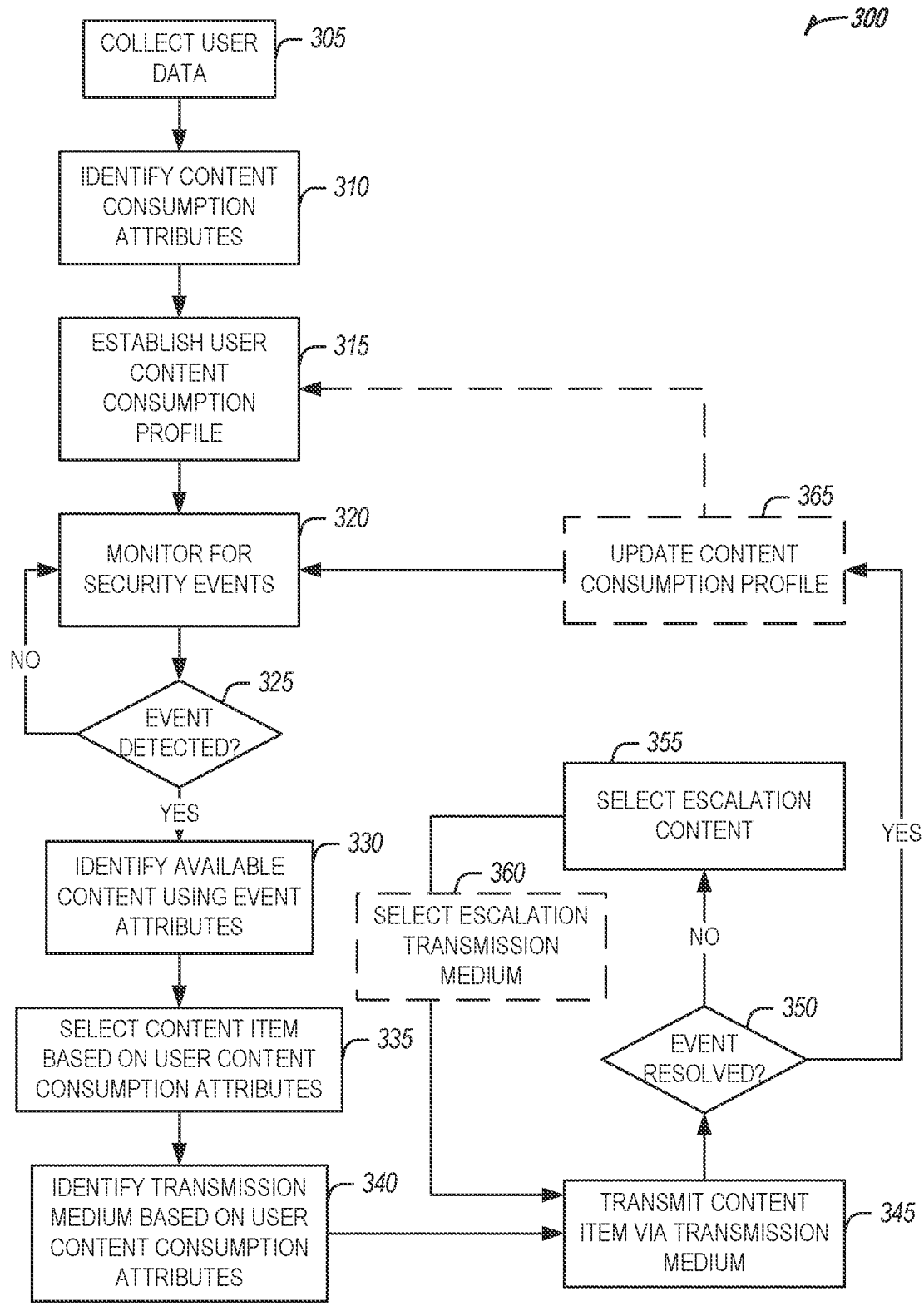
FIG. 3 illustrates an example of a process for security content delivery based on tagged personas, according to an embodiment.

FIG. 3 illustrates an example of a process 300 for security content delivery based on tagged personas, according to an embodiment. The process 300 may provide features as described in FIGS. 1 and 2.

User data may be collected (e.g., at operation 305) and content consumption attributes may be identified for the user from the collected user data (e.g., at operation 310). In an example, the content consumption attributes may be machine learning features extracted from the user data by a machine learning component (e.g., the machine learning component 200 as described in FIG. 2, etc.). A user content consumption profile may be established for the user (e.g., at operation 315). For example, the attributes or machine learning features may be stored in a network file system user profile for the user.

The network file system may be monitored for security events (e.g., at operation 320). When a security event is detected that is associated with the user (e.g., at decision operation 325), content may be identified that is available to assist the user in remediating the event based on event attributes (e.g., at operation 330). A content may be selected for the user based on the content consumption attributes of the user (e.g., at operation 335). For example, the machine learning component may evaluate the features or attributes of the user using the machine learning component to identify a content item that most closely comports with the content consumption profile of the user.

A transmission medium may be identified to be used to transmit the content item to the user based on the content consumption attributes of the user contained in the content consumption profile of the user (e.g., at operation 340). For example, a usages statistic attribute or feature may indicate that the user interacts more frequently with an instant messaging system than an email system or a text messaging system and the instant messaging system may be selected as the transmission medium. The selected content item may be transmitted to the user via the selected transmission medium (e.g., at operation 345).

A result of the transmitted content item may be monitored to determine if the event has been resolved (e.g., at decision operation 350). For example, the event may have been a file exfiltration and the content item may have been an educational video regarding the risk posed by exfiltration of files from the network file system. The network file system usage of the user may be monitored to determine if additional file exfiltration events occur over a period of time. If no additional exfiltration events are detected for the user, the event may be determined to be resolved (e.g., at decision operation 350). If additional exfiltration events are detected for the user, the event may be determined to be unresolved (e.g., at decision operation 350). If the event is determined to be unresolved (e.g., at decision operation 350), escalation content may be selected for the user (e.g., at operation 355).

The escalation content may be selected from the content identified for the event (e.g., at operation 330). In an example, the escalation content may include content in a different format such as another format that may have been a lesser match with the user content consumption profile. In another example, the selected escalation content may be the same format as the originally selected content with additional details of remediation steps or education included (e.g., a more verbose version of the original content). In an example, the originally selected transmission medium may have failed to effectively deliver (e.g., was ignored, unread, failed to be received, etc.) the content to the user and an escalation transmission medium may be selected for the user (e.g., at operation 360). For example, a transmission medium may be selected for escalation that may have a higher reliability attribute or that may be a lesser match to the content consumption profile of the user but a greater match than other available transmission media. The escalation content is transmitted to the user via the transmission medium (e.g., original medium or escalation medium) (e.g., at operation 345).

The network file system is again monitored to determine if the event has been resolved (e.g., at decision operation 350). If the event has been resolved (e.g., as determined at decision operation 350), the content consumption profile may be updated (e.g., at operation 365) if escalation content items or media ultimately led to resolution of the event. For example, text-based content may have failed to resolve the event while the event was resolved following transmission of video content to the user. For example, weights or other attribute adjustments may be applied to the content consumption profile of the user to promote video content and demote text-based content. The network file system continues to be monitored for security event (e.g., at operation 320).

Figure 4:
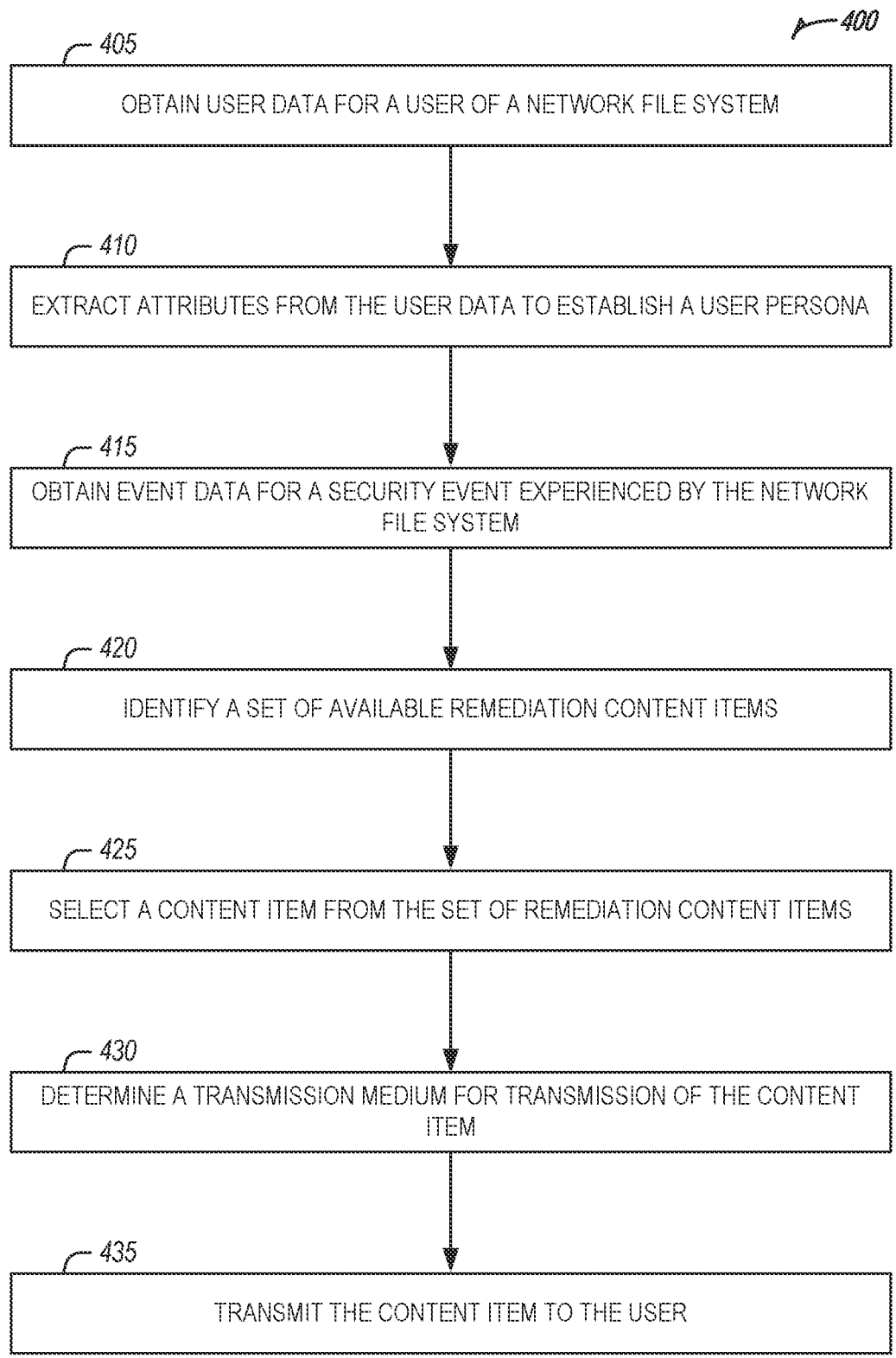
FIG. 4 illustrates an example of a method for security content delivery based on tagged personas, according to an embodiment.

FIG. 4 illustrates an example of a method 400 for security content delivery based on tagged personas, according to an embodiment. The method 400 may provide features as described in FIGS. 1 through 3.

User data may be obtained for a user of a network file system (e.g., at operation 405). In an example, the user data may be obtained from a network directory service, an identify management system, a single-sign-on (SSO) system, a human resources information system, a human capital management system, or user maintained preferences.

Attributes may be extracted from the user data to establish a user persona (e.g., at operation 410). In an example, the attributes may include at least one of a job title of the user, a work department of the user, a billing code of the user, or system usage history of the user.

Event data may be obtained for a security event experienced by the network file system (e.g., at operation 415). In an example, the security event may be associated with the user. In an example, the event data may include at least one of an event type, a criticality attribute, a timestamp, or an event description.

A set of available remediation content items may be identified using the event data (e.g., at operation 420). In an example, the set of available remediation content includes a video content item, a text-based content item, or a remediation script.

A content item may be selected from the set of remediation content items using the user persona (e.g., at operation 425). In an example, a set of training user content consumption data and a set of event information training data may be obtained. Features of the set of training user content consumption data and the set of event information training data may be determined and the features may be extracted from the set of training user content consumption data and the set of event information training data. A machine learning algorithm may be used to generate a content selection model using the features. In an example, features may be extracted from the user persona and the event data. The features may be applied to the content selection model to produce user content consumption preference output for the event for the user and the set of available remediation content items may be evaluated using the user content consumption preference output to select the content.

A transmission medium may be determined for transmission of the content item to the user using the user persona (e.g., at operation 430). In an example, usage statistics of the user for a set of transmission mediums used by the user may be evaluated to calculate a frequency of usage value for each transmission medium of the set of transmission mediums. The transmission medium may be determined as the transmission medium of the set of transmission mediums with the highest frequency of usage value. The content item may be transmitted to the user via the transmission medium (e.g., at operation 435).

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

Example 1 is a system for event remediation content selection based on user persona comprising: at least one processor; and memory including instructions that, when executed by the at least one processor, cause the at least one processor to perform operations to: obtain user data for a user of a network file system; extract attributes from the user data to establish the user persona; obtain event data for a security event experienced by the network file system, the security event associated with the user; identify a set of available remediation content items using the event data; select a content item from the set of remediation content items using the user persona; determine a transmission medium for transmission of the content item to the user using the user persona; and transmit the content item to the user via the transmission medium.

In Example 2, the subject matter of Example 1 wherein, the user data is obtained from a network directory service, an identify management system, a single-sign-on (SSO) system, a human resources information system, a human capital management system, or user maintained preferences.

In Example 3, the subject matter of Examples 1-2 wherein, the attributes include at least one of a job title of the user, a work department of the user, a billing code of the user, or system usage history of the user.

In Example 4, the subject matter of Examples 1-3 wherein, the event data includes at least one of an event type, a criticality attribute, a timestamp, or an event description.

In Example 5, the subject matter of Examples 1-4 wherein, the set of available remediation content includes a video content item, a text-based content item, or a remediation script.

In Example 6, the subject matter of Examples 1-5 includes, the memory further comprising instructions that, when executed by the at least one processor, cause the at least one processor to perform operations to: obtain a set of training user content consumption data and a set of event information training data; determine features of the set of training user content consumption data and the set of event information training data; extract the features from the set of training user content consumption data and the set of event information training data; and generate, using a machine learning algorithm, a content selection model using the features.

In Example 7, the subject matter of Example 6 includes, the instructions to select the content further comprising instructions that, when executed by the at least one processor, cause the at least one processor to perform operations to: extract features from the user persona and the event data; apply the features to the content selection model to produce user content consumption preference output for the event for the user; and evaluate the set of available remediation content items using the user content consumption preference output to select the content.

In Example 8, the subject matter of Examples 1-7 includes, the instructions to determine the transmission medium for transmission of the content item to the user using the user persona further comprising instructions that, when executed by the at least one processor, cause the at least one processor to perform operations to: evaluate usage statistics of the user for a set of transmission mediums used by the user to calculate a frequency of usage value for each transmission medium of the set of transmission mediums; and determine the transmission medium as the transmission medium of the set of transmission mediums with the highest frequency of usage value.

Example 9 is at least one non-transitory machine-readable medium including instructions for event remediation content selection based on user persona that, when executed by at least one processor, cause the at least one processor to perform operations to: obtain user data for a user of a network file system; extract attributes from the user data to establish the user persona; obtain event data for a security event experienced by the network file system, the security event associated with the user; identify a set of available remediation content items using the event data; select a content item from the set of remediation content items using the user persona; determine a transmission medium for transmission of the content item to the user using the user persona; and transmit the content item to the user via the transmission medium.

In Example 10, the subject matter of Example 9 wherein, the user data is obtained from a network directory service, an identify management system, a single-sign-on (SSO) system, a human resources information system, a human capital management system, or user maintained preferences.

In Example 11, the subject matter of Examples 9-10 wherein, the attributes include at least one of a job title of the user, a work department of the user, a billing code of the user, or system usage history of the user.

In Example 12, the subject matter of Examples 9-11 wherein, the event data includes at least one of an event type, a criticality attribute, a timestamp, or an event description.

In Example 13, the subject matter of Examples 9-12 wherein, the set of available remediation content includes a video content item, a text-based content item, or a remediation script.

In Example 14, the subject matter of Examples 9-13 includes, instructions that, when executed by the at least one processor, cause the at least one processor to perform operations to: obtain a set of training user content consumption data and a set of event information training data; determine features of the set of training user content consumption data and the set of event information training data; extract the features from the set of training user content consumption data and the set of event information training data; and generate, using a machine learning algorithm, a content selection model using the features.

In Example 15, the subject matter of Example 14 includes, the instructions to select the content further comprising instructions that, when executed by the at least one processor, cause the at least one processor to perform operations to: extract features from the user persona and the event data; apply the features to the content selection model to produce user content consumption preference output for the event for the user; and evaluate the set of available remediation content items using the user content consumption preference output to select the content.

In Example 16, the subject matter of Examples 9-15 includes, the instructions to determine the transmission medium for transmission of the content item to the user using the user persona further comprising instructions that, when executed by the at least one processor, cause the at least one processor to perform operations to: evaluate usage statistics of the user for a set of transmission mediums used by the user to calculate a frequency of usage value for each transmission medium of the set of transmission mediums; and determine the transmission medium as the transmission medium of the set of transmission mediums with the highest frequency of usage value.

Example 17 is a method for event remediation content selection based on user persona comprising: obtaining user data for a user of a network file system; extracting attributes from the user data to establish the user persona; obtaining event data for a security event experienced by the network file system, the security event associated with the user; identifying a set of available remediation content items using the event data; selecting a content item from the set of remediation content items using the user persona; determining a transmission medium for transmission of the content item to the user using the user persona; and transmitting the content item to the user via the transmission medium.

In Example 18, the subject matter of Example 17 wherein, the user data is obtained from a network directory service, an identify management system, a single-sign-on (SSO) system, a human resources information system, a human capital management system, or user maintained preferences.

In Example 19, the subject matter of Examples 17-18 wherein, the attributes include at least one of a job title of the user, a work department of the user, a billing code of the user, or system usage history of the user.

In Example 20, the subject matter of Examples 17-19 wherein, the event data includes at least one of an event type, a criticality attribute, a timestamp, or an event description.

In Example 21, the subject matter of Examples 17-20 wherein, the set of available remediation content includes a video content item, a text-based content item, or a remediation script.

In Example 22, the subject matter of Examples 17-21 includes, obtaining a set of training user content consumption data and a set of event information training data; determining features of the set of training user content consumption data and the set of event information training data; extracting the features from the set of training user content consumption data and the set of event information training data; and generating, using a machine learning algorithm, a content selection model using the features.

In Example 23, the subject matter of Example 22 wherein, selecting the content further comprises: extracting features from the user persona and the event data; applying the features to the content selection model to produce user content consumption preference output for the event for the user; and evaluating the set of available remediation content items using the user content consumption preference output to select the content.

In Example 24, the subject matter of Examples 17-23 wherein, determining the transmission medium for transmission of the content item to the user using the user persona further comprises: evaluating usage statistics of the user for a set of transmission mediums used by the user to calculate a frequency of usage value for each transmission medium of the set of transmission mediums; and determining the transmission medium as the transmission medium of the set of transmission mediums with the highest frequency of usage value.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for event remediation content selection based on user persona comprising:
   at least one processor; and
   memory including instructions that, when executed by the at least one processor, cause the at least one processor to perform operations to:
   obtain user data for a user of a network file system from user attributes associated with user accessible services provided within the network file system;
   extract attributes from the user data to establish the user persona;
   obtain event data for a security event experienced by the network file system, the security event associated with the user;
   identify a set of available remediation content items using the event data;
   select a content item from the set of available remediation content items using the user persona;
   determine a transmission medium for transmission of the content item to the user using the user persona based on content consumption attributes of the user contained in the user persona; and
   transmit the content item to the user via the transmission medium.

2. The system of claim 1, wherein the user data is obtained from a network directory service, an identify management system, a single-sign-on (SSO) system, a human resources information system, a human capital management system, or user maintained preferences.

3. The system of claim 1, wherein the attributes include at least one of a job title of the user, a work department of the user, a billing code of the user, or system usage history of the user.

4. The system of claim 1, wherein the event data includes at least one of an event type, a criticality attribute, a timestamp, or an event description.

5. The system of claim 1, wherein the set of available remediation content items includes a video content item, a text-based content item, or a remediation script.

6. The system of claim 1, the memory further comprising instructions that, when executed by the at least one processor, cause the at least one processor to perform operations to:
 obtain a set of training user content consumption data and a set of event information training data;
 determine features of the set of training user content consumption data and the set of event information training data;
 extract the features from the set of training user content consumption data and the set of event information training data; and
 generate, using a machine learning algorithm, a content selection model using the features.

7. The system of claim 6, the instructions to select the content item further comprising instructions that, when executed by the at least one processor, cause the at least one processor to perform operations to:
 extract features from the user persona and the event data;
 apply the features to the content selection model to produce user content consumption preference output for the security event for the user; and
 evaluate the set of available remediation content items using the user content consumption preference output to select the content item.

8. The system of claim 1, the instructions to determine the transmission medium for transmission of the content item to the user using the user persona further comprising instructions that, when executed by the at least one processor, cause the at least one processor to perform operations to:
 evaluate usage statistics of the user for a set of transmission mediums used by the user to calculate a frequency of usage value for each transmission medium of the set of transmission mediums; and
 determine the transmission medium as the transmission medium of the set of transmission mediums with a highest frequency of usage value.

9. At least one non-transitory machine-readable medium including instructions for event remediation content selection based on user persona that, when executed by at least one processor, cause the at least one processor to perform operations to:
 obtain user data for a user of a network file system from user attributes associated with user accessible services provided within the network file system;
 extract attributes from the user data to establish the user persona;
 obtain event data for a security event experienced by the network file system, the security event associated with the user;
 identify a set of available remediation content items using the event data;
 select a content item from the set of available remediation content items using the user persona;
 determine a transmission medium for transmission of the content item to the user using the user persona based on content consumption attributes of the user contained in the user persona; and
 transmit the content item to the user via the transmission medium.

10. The at least one non-transitory machine-readable medium of claim 9, further comprising instructions that, when executed by the at least one processor, cause the at least one processor to perform operations to:
 obtain a set of training user content consumption data and a set of event information training data;
 determine features of the set of training user content consumption data and the set of event information training data;
 extract the features from the set of training user content consumption data and the set of event information training data; and
 generate, using a machine learning algorithm, a content selection model using the features.

11. The at least one non-transitory machine-readable medium of claim 10, the instructions to select the content item further comprising instructions that, when executed by the at least one processor, cause the at least one processor to perform operations to:
 extract features from the user persona and the event data;
 apply the features to the content selection model to produce user content consumption preference output for the security event for the user; and
 evaluate the set of available remediation content items using the user content consumption preference output to select the content item.

12. The at least one non-transitory machine-readable medium of claim 9, the instructions to determine the transmission medium for transmission of the content item to the user using the user persona further comprising instructions that, when executed by the at least one processor, cause the at least one processor to perform operations to:
 evaluate usage statistics of the user for a set of transmission mediums used by the user to calculate a frequency of usage value for each transmission medium of the set of transmission mediums; and
 determine the transmission medium as the transmission medium of the set of transmission mediums with a highest frequency of usage value.

13. A method for event remediation content selection based on user persona comprising:
 obtaining user data for a user of a network file system from user attributes associated with user accessible services provided within the network file system;
 extracting attributes from the user data to establish the user persona;
 obtaining event data for a security event experienced by the network file system, the security event associated with the user;
 identifying a set of available remediation content items using the event data;
 selecting a content item from the set of available remediation content items using the user persona;
 determining a transmission medium for transmission of the content item to the user using the user persona based on content consumption attributes of the user contained in the user persona; and
 transmitting the content item to the user via the transmission medium.

14. The method of claim 13, wherein the user data is obtained from a network directory service, an identify management system, a single-sign-on (SSO) system, a human resources information system, a human capital management system, or user maintained preferences.

15. The method of claim 13, wherein the attributes include at least one of a job title of the user, a work department of the user, a billing code of the user, or system usage history of the user.

16. The method of claim 13, wherein the event data includes at least one of an event type, a criticality attribute, a timestamp, or an event description.

17. The method of claim 13, wherein the set of available remediation content items includes a video content item, a text-based content item, or a remediation script.

18. The method of claim 13, further comprising:
obtaining a set of training user content consumption data and a set of event information training data;
determining features of the set of training user content consumption data and the set of event information training data;
extracting the features from the set of training user content consumption data and the set of event information training data; and
generating, using a machine learning algorithm, a content selection model using the features.

19. The method of claim 18, wherein selecting the content item further comprises:
extracting features from the user persona and the event data;
applying the features to the content selection model to produce user content consumption preference output for the security event for the user; and
evaluating the set of available remediation content items using the user content consumption preference output to select the content item.

20. The method of claim 13, wherein determining the transmission medium for transmission of the content item to the user using the user persona further comprises:
evaluating usage statistics of the user for a set of transmission mediums used by the user to calculate a frequency of usage value for each transmission medium of the set of transmission mediums; and
determining the transmission medium as the transmission medium of the set of transmission mediums with a highest frequency of usage value.

* * * * *